(12) United States Patent
Schroeder et al.

(10) Patent No.: US 7,205,759 B2
(45) Date of Patent: Apr. 17, 2007

(54) APPARATUS AND METHOD FOR DETERMINING AN ENGINE SPEED

(75) Inventors: Thaddeus Schroeder, Rochester Hills, MI (US); Elias Taye, Macomb Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 240 days.

(21) Appl. No.: 11/064,580

(22) Filed: Feb. 24, 2005

(65) Prior Publication Data

US 2006/0186875 A1   Aug. 24, 2006

(51) Int. Cl.
*G01P 3/46* (2006.01)

(52) U.S. Cl. ..................................... 324/163
(58) Field of Classification Search ................ 324/160, 324/163, 207.15, 209; 73/862.69, 494, 514.39, 73/514.16, 514.31, 535, 116, 117.2, 117.3, 73/118.1, 773
See application file for complete search history.

(56) References Cited

U.S. PATENT DOCUMENTS

| | | | | |
|---|---|---|---|---|
| 2,952,807 A * | 9/1960 | Heller | ..................... | 73/514.39 |
| 4,520,658 A | 6/1985 | Ryan et al. | ................. | 73/117.3 |
| 4,539,841 A | 9/1985 | Schroeder et al. | ............ | 73/116 |
| 4,936,277 A | 6/1990 | Deutsch | ...................... | 123/436 |
| 5,132,909 A | 7/1992 | Schroeder et al. | ..... | 364/431.03 |
| 6,215,285 B1 | 4/2001 | Harmon | ........................ | 322/29 |
| 6,320,374 B1 | 11/2001 | Schroeder et al. | ..... | 324/207.25 |
| 6,346,808 B1 | 2/2002 | Schroeder | .............. | 324/207.21 |
| 6,411,080 B1 | 6/2002 | Bach et al. | ................. | 324/173 |
| 6,538,429 B2 | 3/2003 | Schroeder et al. | ....... | 324/207.2 |
| 6,546,911 B1 | 4/2003 | Fayyad et al. | ......... | 123/406.13 |
| 6,786,084 B2 | 9/2004 | Schroeder et al. | ......... | 73/117.3 |
| 2004/0211268 A1 | 10/2004 | Morelli et al. | ........... | 73/862.69 |
| 2004/0250632 A1 | 12/2004 | Schroeder et al. | ..... | 73/862.332 |
| 2005/0007103 A1 | 1/2005 | Schroeder et al. | ..... | 324/207.25 |
| 2005/0007104 A1 | 1/2005 | Lequesne et al. | ...... | 324/207.25 |

OTHER PUBLICATIONS

Wiley Interscience Publication, "Ferromagnetism" by Richard M. Bozorth p. 616.

* cited by examiner

*Primary Examiner*—Edward Lefkowitz
*Assistant Examiner*—Kenneth J Whittington
(74) *Attorney, Agent, or Firm*—Scott A. McBain

(57) ABSTRACT

A removable sensor assembly for non-intrusively sensing instantaneous speed of an engine comprising a crankshaft having a respective end equipped with an externally accessible bolt, the removable sensor assembly comprising: a housing comprising a recess configured to removably receive and engage a portion of the externally accessible bolt; and a force sensing device received in the housing, the force sensing device being configured to wirelessly provide information indicative of angular motion of the crankshaft, the force sensing device comprising: at least one coil; a power supply for providing an excitation to the coil, wherein the coil provides a first signal and a second signal each corresponding to the movement of the housing, the first signal corresponding to the resistance of the coil and the second signal corresponding to the inductance of the coil; and a signal transmitter coupled to the coil to receive and transmit the first signal and the second signal.

19 Claims, 4 Drawing Sheets

APPARATUS AND METHOD FOR DETERMINING AN ENGINE SPEED

TECHNICAL FIELD

This present invention relates generally to engine speed sensors. More specifically, the present invention relates to an apparatus and method for determining an engine speed.

BACKGROUND

Engine rotational speed information, (e.g., the speed of the crankshaft), may be needed for the control of engine operation, such as determining proper spark and fuel injection timing, gear shifting in automatic transmissions, etc. These control functions may require the average engine speed value over no less than one full revolution. The actual engine speed, however, is not constant. Even in a steady state, an internal combustion (IC) engine generally exhibits cyclical speed variations attributable to the operation of its cylinders. Each individual cylinder slows the engine during its compression cycle and speeds it up during its power cycle.

In the field of vehicular diagnostics, accurate instantaneous engine speed information enables the detection and diagnosis of many engine problems, even subtle ones. See, for example, U.S. Pat. Nos. 4,539,841 and 4,520,658, respectively titled "Method For Determining Engine Cylinder Compression Pressure and Power Output" and "Method For Locating Engine Top Dead Center Position," for some exemplary engine diagnostic applications that use instantaneous engine speed information. Presently, there is a limited choice in the ways of obtaining such information. For example, it is known that one can tap into the crank sensor wiring, or use a separate, intrusive sensing technique, such as mounting a sensor in the bell housing to sense the rotation of the ring gear.

Shortcomings of the first approach for obtaining instantaneous engine speed information may include burdensomely locating and gaining access to the crank sensor connector, the location of which connector typically varies from vehicle to vehicle. This generally results in incremental costs since even just a few additional minutes per vehicle cumulatively may add up to substantial costs when servicing a large number of vehicles. Secondly, the characteristics of the crank position signal commonly differ from one vehicle to another in terms of signal resolution (e.g. 6×, 24×, 60×), coding and format (e.g., analog or digital format). Similarly, costly and time-consuming inefficiencies may arise with the second approach for obtaining instantaneous engine speed information since intrusive sensing of engine speed is generally not conducive to quick and cost-effective servicing and/or diagnostics operations, and often requires costly vehicle modification.

What is desirable is a non-intrusive, user-friendly, easily attachable/detachable low-cost and reliable sensor assembly that would provide accurate instantaneous engine speed information. It would be further desirable to provide sensing techniques and sensor assembly that would result in highly accurate instantaneous engine crankshaft speed information independently of the crankshaft sensor of the engine. It would be further desirable to provide sensor assembly and sensing techniques that would allow for accurately detecting variation of engine speed as well as the magnitude of the engine speed itself. It would be also desirable to provide a sensor assembly that may be universally used in a wide variety of vehicular configurations without any specialized training or tooling requirements from one vehicular configuration to another.

SUMMARY

Disclosed herein is a device and method for non-intrusively sensing instantaneous speed of an engine. The apparatus comprises a sensor assembly being configured to be secured to a crankshaft having a respective end connected to an externally accessible bolt. The sensor assembly comprises a housing including a recess configured to affixingly engage the externally accessible bolt. The sensor assembly further comprises at least one motion-sensing sensing device in the housing configured to provide a respective output signal indicative of angular motion information of the crankshaft. A signal transmitter coupled to the motion-sensing device configured to wirelessly transmit the output signal from the motion-sensing device.

In another aspect thereof, exemplary embodiments of the present invention provide a method for non-intrusively sensing instantaneous speed of an engine comprising a crankshaft having a respective end connected to an externally accessible bolt. The method allows affixing a sensor assembly to the externally accessible bolt. The method further allows providing at least one motion-sensing device in the sensor assembly configured to provide a respective output signal indicative of angular motion information of the crankshaft. A signal transmitter is coupled to the motion-sensing device to wirelessly transmit the output signal from the motion sensing device.

In one embodiment, a removable sensor assembly for non-intrusively sensing instantaneous speed of an engine comprising a crankshaft having a respective end connected to an externally accessible bolt, the removable sensor assembly comprising: a housing comprising a recess configured to removably receive and engage a portion of the externally accessible bolt; and a force sensing device received in the housing, the force sensing device being configured to wirelessly provide information indicative of angular motion of the crankshaft, the force sensing device comprising: at least one coil; a power supply for providing an excitation to the coil, wherein the coil provides a first signal, a second signal either one or both corresponding to the movement of the housing, the first signal corresponding to the resistance of the coil and the second signal corresponding to the inductance of the coil if a magnetostrictive wire is used; and a signal transmitter coupled to the coil to receive and transmit the first signal and the second signal.

The above-described and other features of the present disclosure will be appreciated and understood by those skilled in the art from the following detailed description, drawings, and appended claims.

DESCRIPTION OF EXEMPLARY EMBODIMENTS

Figure 1:
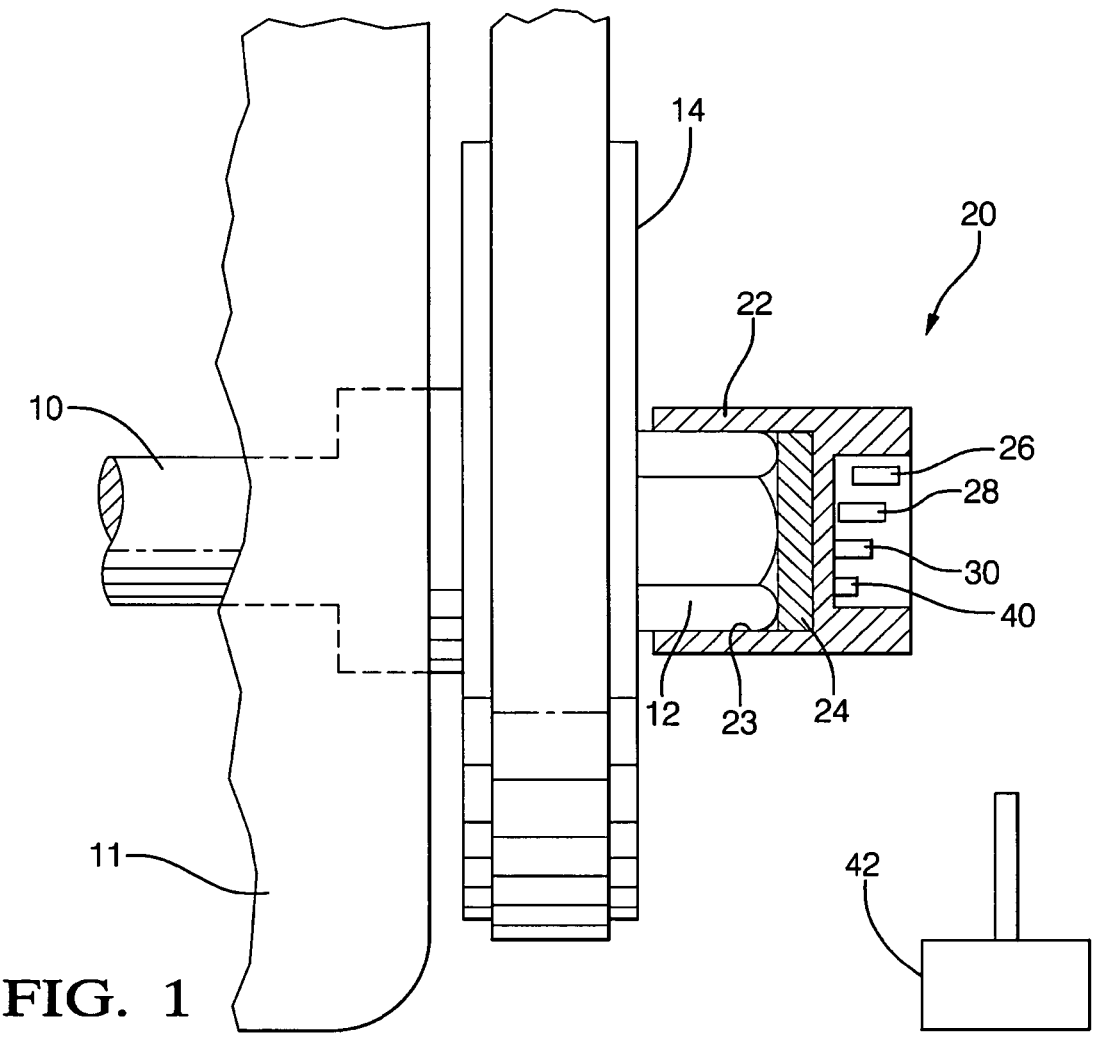
FIG. 1 illustrates a sensor assembly of an exemplary embodiment of the present invention.

Reference is made to the following commonly owned and assigned U.S. patent application Ser. No. 10/423,317, filed Apr. 25, 2003 and U.S. Pat. No. 6,786,084, the contents of which are incorporated herein by reference thereto.

Disclosed herein is a method and apparatus for angular motion sensing, and, more particularly, a sensor assembly and techniques for non-intrusively sensing instantaneous speed of an internal combustion engine.

As suggested above, even in a steady state condition, an internal combustion (IC) engine exhibits cyclical speed variations attributable to the operation of its cylinders. The frequency of these speed variation cycles depends on factors, such as the number of cylinders in the engine and whether the engine is of a two or a four-cycle type. In two cycle engines, each of the cylinders undergoes respective compression and firing actions during each engine revolution. Hence, there will be as many speed cycles per engine revolution as there are cylinders, and they will be spaced 360/n crank angle degrees (CAD) apart, where n is the number of cylinders. In four cycle engines, one half of the cylinders undergoes respective compression and firing actions during one engine revolution, the other half—during the following revolution. In this case there will be n/2 speed cycles per revolution and they will be spaced 720/n CAD apart.

The magnitude of these speed variations may depend on factors, such as the compression ratio of the engine, number of cylinders (more specifically, the degree of overlap of compression and firing cycles between the adjacent in firing order cylinders), engine speed and load. For example, in an idling four-cylinder diesel engine, the magnitude of speed variations can be as high as 200 RPM, in an idling four-cylinder gasoline engine—60 RPM, and 40 RPM in an 8-cylinder engine.

It is noted that in any practical embodiment any signal or data indicative of instantaneous engine speed information should be obtained directly from the crankshaft of the engine of the vehicle. For example, one may conceptually consider using any of the belt-driven pulleys or other rotating accessories in the vehicle to extract engine speed information, since such pulleys or accessories may be readily accessible. Such information, however, would likely be affected by the fairly complex dynamics of the harmonic balancer and the drive belt, and, in practice, may differ considerably from the actual crank speed of the engine.

It is believed that in one exemplary embodiment, one prime sensing location where a crankshaft 10 of an engine 11 may be non-intrusively accessible is through the head of a bolt 12 for attaching a belt-driving pulley 14 to a respective end of the crankshaft, such as in the front of the engine.

Exemplary embodiments of the present invention are directed to a relatively inexpensive wireless sensor assembly 20 that is easily mounted/demounted on such non-intrusively accessible location. Moreover, the portability of the sensor assembly allows the same to have a rechargeable power supply that is easily recharged. This makes the same particularly useful in diagnostic procedures wherein the sensor assembly 20 is used with a diagnostic device configured to receive the engine or vehicle data.

In one exemplary embodiment, components that make up the sensor assembly may be housed in a housing 22 configured to define a recess 23 engageable with the bolt head in a similar fashion as a wrench socket would be insertable over a hex nut, for example. In one exemplary embodiment, the sensor assembly would be securely held in place relative to the bolt head by a permanent magnet 24, such as may be affixed at the bottom of the recess. It will be appreciated that providing a permanent magnet is just one example of a quick and secure mounting arrangement for the sensor assembly since non-magnetic mounting arrangements, such as anchor posts or snappable clamps, may be used to implement the mechanical affixing of the sensor assembly to the bolt head. Another non-limiting example comprises a threaded recess for engaging threads on a portion of the bolt head.

As illustrated in FIG. 1, it is contemplated that in one exemplary embodiment, the sensor assembly may comprise at least one motion-sensing device 26, a signal transmitter 28, such as a radio frequency (RF) transmitter, infrared transmitter, ultrasound transmitter, or any other transmitter device capable of wirelessly transmitting information, and a self-contained power source 30, such as a relatively small rechargeable battery. In one exemplary embodiment, an external power source may be coupled through inductive coupling, for example, for powering the sensor assembly.

Figure 2:
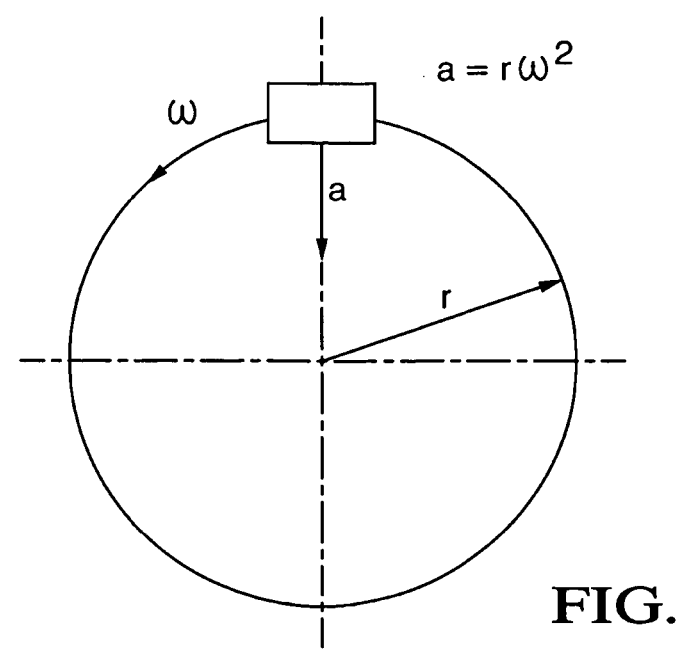
FIG. 2 illustrates the principle of sensing angular velocity using an accelerometer.

When a body revolves around a center of rotation it is affected by a centripetal acceleration directed toward the center of rotation (see FIG. 2). Placing a properly oriented accelerometer on a revolving body at a specified distance r from the center of rotation permits a continuous angular speed measurement. The output signal will be proportional to the product of r and the square of angular velocity. The output signal can be processed to yield actual velocity value. However, for engine diagnostic purposes it might be advantageous to use the square of velocity since it enhances the detection of engine speed variations, whose relative magnitude declines with increasing engine speeds.

In accordance with exemplary embodiments of the present invention, a force sensor is used instead of an accelerometer to measure the instantaneous angular velocity of the engine crankshaft. In accordance with an exemplary embodiment, a continuous summing sensor is provided. The sensor comprises at least one coil, which will provide an output signal corresponding to the change in resistance of the coil and/or a change in permeability of the coil when the coil is subjected to a centrifugal force. As a centrifugal force is applied the coil stretches and the sensing assembly will provide an output that corresponds to the tensile stress imposed on the coil. Accordingly, a portion of the sensing assembly is set up as a strain gauge wherein the resistance of the wire of the coil is measured and the speed of the crankshaft is determined. Accordingly, a wheatstone bridge may be employed to measure the change in resistance of the wire of the coil. However and at lower speeds, such a sensing methodology provides a very small signal or little change in measured resistance (e.g., coil stretching) as opposed to the measured voltage output at higher engine speeds.

Thus, and in order to provide measurements at lower speeds the coil wire is chosen from a material that is a magnetostrictive material with a positive coefficient, which changes its magnetic permeability under stress (Villar effect). This means the permeability of the magnetostrictive material decreases with applied stress. An example of a magnetic force sensor and control circuit employing a coil wound about a magnetostrictive material is described in commonly owned and assigned U.S. patent application Ser. No. 10/423,317, filed Apr. 25, 2003. In accordance with exemplary embodiments of the present invention, the coil wire itself is the magnetostrictive material. However, the control circuit and methods for excitation to coil may be similar to those described in U.S. patent application Ser. No. 10/423,317. Accordingly, a portion of the sensing assembly is also configured to measure and transmit the inductance change of the coil, which in one exemplary embodiment is a change in the output voltage $V_{out}$. See for example, the plots of FIG. 5 wherein the permeability of an Alloy 52 wire is measured (inductive mode) as well as the voltage output (resistive strain gauge mode).

Accordingly, the coil in an exemplary embodiment is a magnetostrictive material with a positive coefficient as a well as a material capable of providing a change of resistance when subjected to a centrifugal force.

Figure 3:
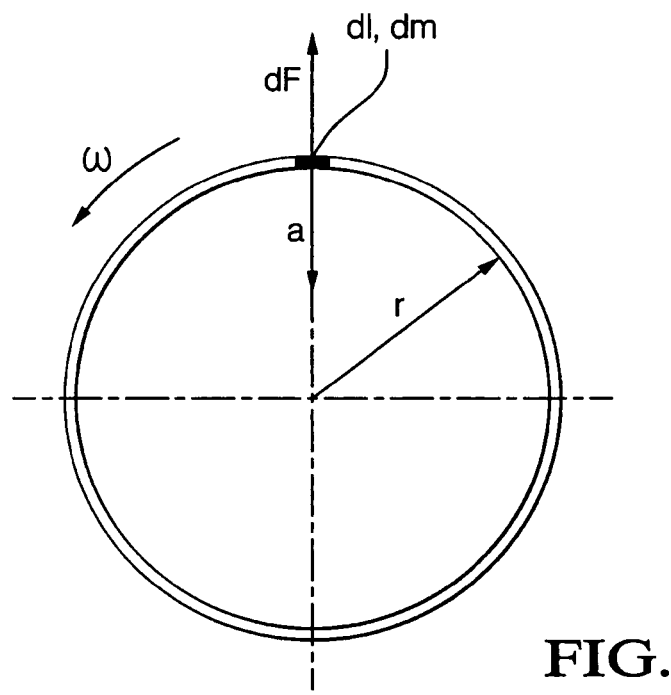
FIG. 3 illustrates the principle of sensing angular velocity using a ring force sensor.
Figure 6:
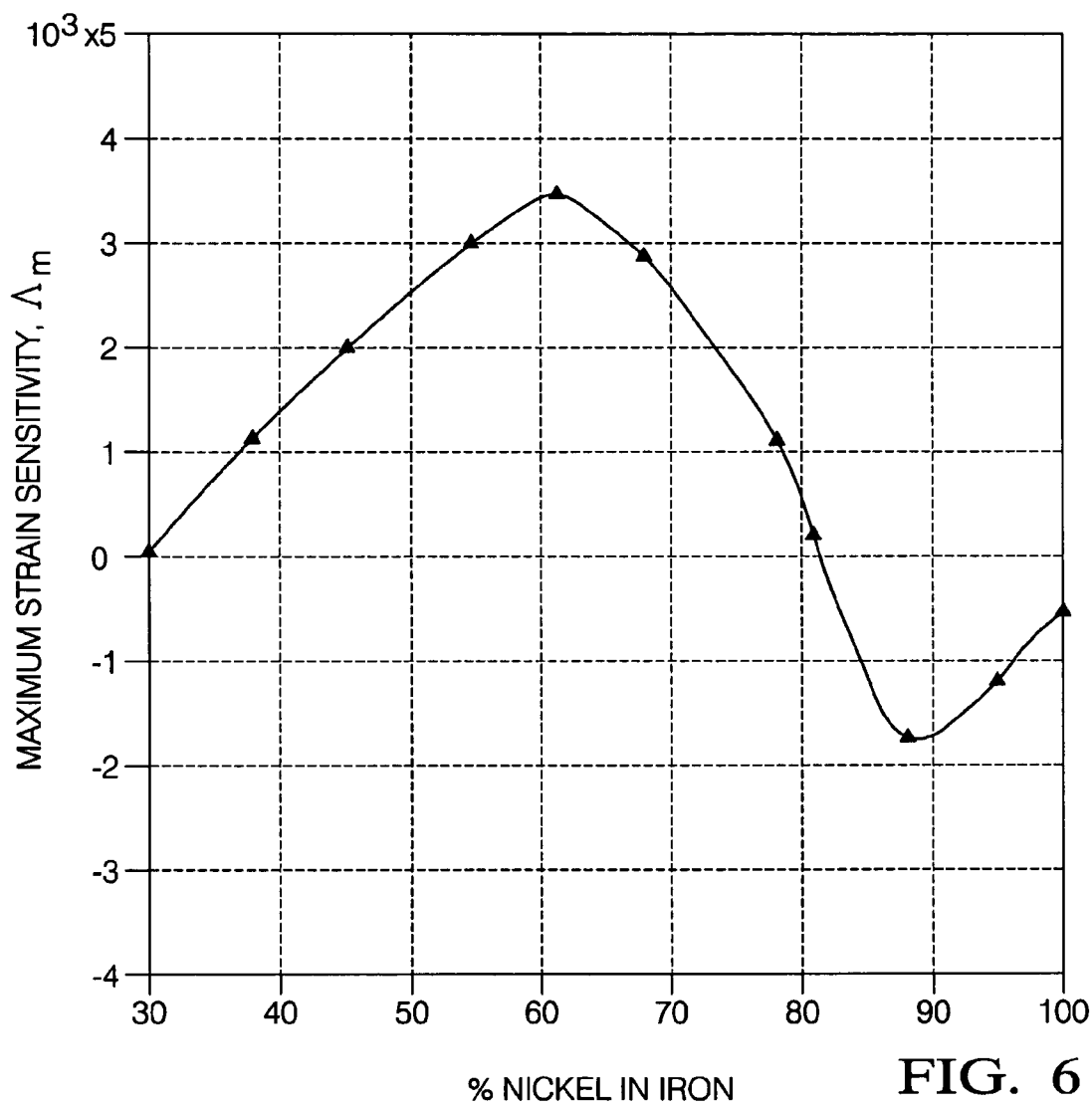
FIG. 6 is a graph illustrating the maximum stress sensitivity of a magnetostrictive material dependent on nickel content.

Furthermore and in accordance with an exemplary embodiment the force sensor is a distributed force sensor configured as a circular ring. Depending on the sensor body design, the effect of centrifugal force on this ring could be either tension or compression. FIG. 3 illustrates a ring force sensor and the principle of operation of such a sensor. With reference to FIG. 3 the following is noted:

$$a = r\omega^2$$

$$dm = dl \times S \times \rho$$

$$dF = dm \times a = dl \times S \times \rho \times r \times \omega^2$$

where
- dF—centrifugal force exerted on loop segment of length dl
- a—centripetal acceleration
- ω—rotational speed
- S—cross-sectional area of wire
- r—loop radius
- dl—segment of loop
- dm—mass of loop segment dl
- ρ—specific mass of wire material This general concept of a circular force sensor configuration gives a variety of options regarding its physical implementation—resistive, capacitive, magnetostrictive, etc., with or without moving parts. Again, and as discussed above an example of a magnetic force sensor is found in U.S. patent application Ser. No. 10/423,317 filed Apr. 25, 2003, the contents of which are incorporated herein by reference thereto. However, in that application the coil is wound about a magnetostrictive material as opposed to the coil comprising the magnetostrictive material. In an exemplary embodiment, the force sensor is a multi-turn wire coil. In the case of a resistive force sensor, the wire material can be any resistive alloy, or even copper magnet wire. This embodiment then is akin to a strain gauge. In case of a magnetostrictive sensor based on the Villari effect, the wire will be made of nickel iron alloy having nickel in the range of 30–82 percent. See for example the graph of FIG. 6, which illustrates the maximum stress sensitivity of a magnetostrictive material dependent on nickel content. The aforementioned graph is found on page 616 of Ferromagnetism (an IEEE Press Classic Reissue) by Richard Bozorth.

A non-limiting example of an exemplary embodiment comprises a nickel alloy wire having 62% Ni and 48% Fe. Another non-limiting example would be a coil made from Alloy 52 or a coil comprising 50.5% Ni and 49.5% Fe. It is, of course, understood that nickel alloy wires of percentages greater or less than the aforementioned value are considered to be within the scope of the present invention.

Figure 4:
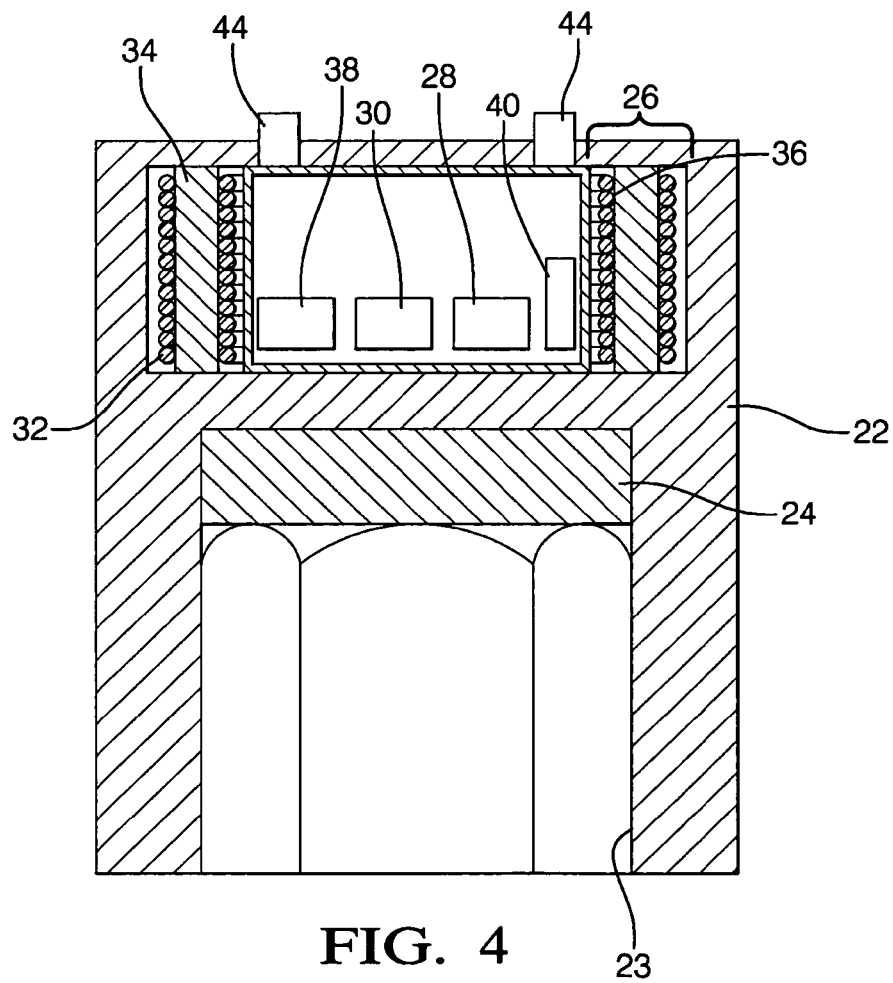
FIG. 4 is a cross sectional view of a sensor assembly according to an exemplary embodiment of the present invention.

With either the resistive or the magnetostrictive approach, it is desirable to operate in a differential mode in order to eliminate common mode disturbances (e.g. variations due temperature changes). For that reason an exemplary embodiment uses two matching coils—one under compression (e.g., a reference coil) and one under tension, as shown in FIG. 4. Thus, the signals of the two coils are transmitted wirelessly to a receiver station, which in one embodiment uses the data in a diagnostic process. In an exemplary embodiment, the receiver station receives the transmitted signals (e.g., Vout (inductance) or Vr (resistance)) from both the reference coil and the compression coil wherein the same are used in calculations to determine engine speed. Alternatively, the required circuitry can be placed upon the sensor wherein the transmitted signals are the speed signals. However, and in this embodiment, the speed sensor assembly will be much more complicated and thus, more expensive to manufacture. Referring now to FIG. 4, an exemplary embodiment is illustrated; here the sensing device comprises a speed sensing coil 32 disposed about a rigid ring 34. Ring 34 is disposed about a reference coil 36. As discussed above, reference coil 36 is under compression via the rigid ring while the speed sensing coil is under tension. An example of a material for reference coil 36 is copper and alloys thereof and nickel and alloys thereof. Alternatively, the reference coil may comprise a magnetostrictive material or stainless steel material. In accordance with an exemplary embodiment, the reference coil may be disposed within the solid ring and the speed sensing coil or alternatively the reference coil may be disposed around the outer periphery of the speed sensing coil.

Figure 5:
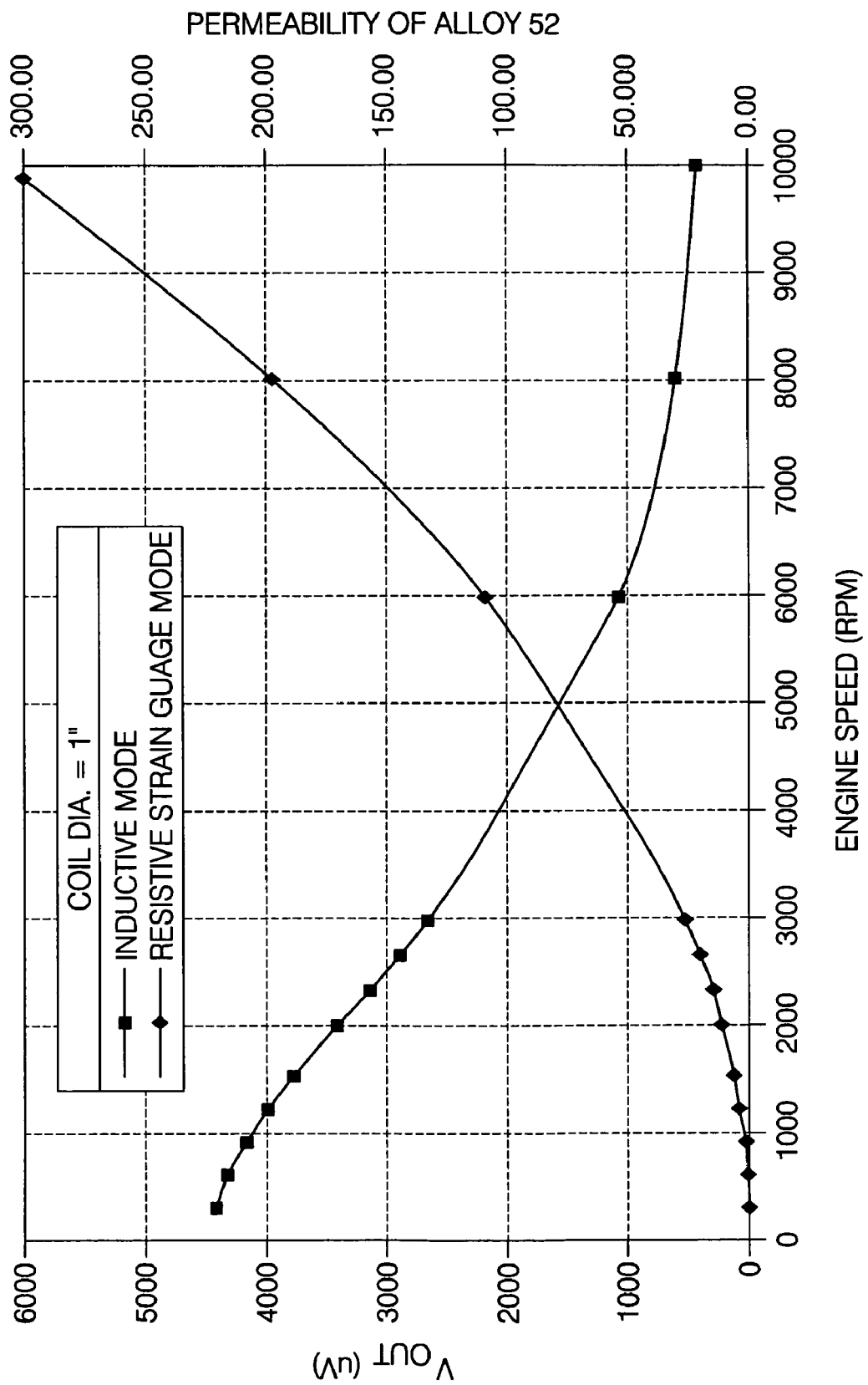
FIG. 5 is a response of a single coil made from Alloy 52 in accordance with an exemplary embodiment of the present invention vs. engine speed.

An interface circuit 38 comprising an integrated circuit and necessary electronic components for receiving the signals of the coils is in electrical communication with the reference coil and the speed sensing coil as well as the power supply and the radio frequency transmitter. In the exemplary embodiment, the coil wire is a NiFe alloy and the sensing device operates in both an inductive mode and a resistive strain gauge mode, wherein at lower RPMs the inductive mode will provide more sensitivity than the resistive strain gauge mode. However, at higher revolutions the resistive strain gauge mode provides greater sensitivity or resolution. Accordingly, the interface circuit 38 is configured to provide both signals (e.g., resistive and inductive) via a wireless transmitter to a diagnostic device that is configured to determine the vehicle engine speed via the signals received by the radio frequency transmitter. FIG. 5 illustrates a plot of experimental data illustrating the sensitivity of both modes with respect to engine speed. Accordingly, the sensing device will provide both signals in order to provide an accurate signal corresponding to the engine speed (RPM).

In an exemplary embodiment the transmitter will provide one signal indicative of measured resistance and one signal indicative of measured inductance, each being corrected by the reference coil or the signals of the reference coil are also transmitted for use in a correction logic of the diagnostic device in order to determine engine speed. The signals may be encoded in a single transmission or each being separately transmitted depending on the signal transmitter configuration. In an encoded format the first 10 bits of a 16 bit format could be used to carry one signal and the next 6 bits could be used to carry the other signal. Of course, other encoded formats are contemplated. It will be appreciated that the bandwidth requirements of the communication channel enabled by the transmitter are relatively straightforward. For example, assuming the highest engine speed is 6,000 RPM, (100 hertz), and further assuming that one conservatively chooses the upper limit of the communication channel bandwidth to be 100 times away from the highest frequency in the modulating signal, that would result in a bandwidth of just 10 kilohertz. Thus, as suggested above, the wireless transmission of the angular motion information may be readily accomplished in a variety of uncomplicated and inexpensive ways. The angular motion information from the transmitter would be electrically coupled to a suitable antenna 40 to be wirelessly transmitted to an externally-based receiver 42, which may be part of an engine diagnostic system, such as disclosed in the patents cited in the background section of this specification.

The use of two signals (resistance and inductance) provides a degree of redundancy and also enhances the overall speed sensing accuracy. The derivation and combining of these two signals could be performed within the sensor assembly prior to the wireless transmission to the external diagnostic unit. One exemplary technique for combining these two signals into a single enhanced signal would be to add in a summer for the two signals, wherein a single speed signal may be transmitted. Here, a straightforward single channel transmitter in the sensor assembly would suffice to transmit the information to the external receiver however the sensing assembly electronic would be more complex.

Alternatively, as suggested above, each signal could be transmitted out, either on two separate channels or multiplexed on a single channel using a multiplexer. As will be appreciated by those skilled in the art, having both signals available to the diagnostic unit could enhance the diagnostic capabilities since the diagnostic unit would likely comprise substantial processing capability for extracting valuable information regarding the condition of the engine, based on the received information. It will be appreciated that a sensor assembly without any signal processing circuitry would be simpler and less expensive than one that includes such signal processing circuitry within the sensor assembly.

FIG. 5 also depicts the change in permeability g of Alloy 52 and the differential signal due to wire resistance change caused by stretching. As can be seen in this Figure, at lower engine speeds it is preferable to rely on coil inductance measurement related directly to permeability i, and at higher engine speeds, on coil resistance measurement. In addition, and in accordance with an exemplary embodiment, the sensing device also operates in a differential mode in order to eliminate common mode disturbances (e.g. variations due temperature changes) wherein the inductance and resistance of the two matching coils is measured, wherein one of the coils is under compression and the other one is under tension.

Thus, as suggested above, the wireless transmission of the angular motion information may be readily accomplished in a variety of uncomplicated and inexpensive ways. The sensed force from the transmitter would be electrically coupled to a suitable antenna 40 to be wirelessly transmitted to an externally-based receiver 42, which may be part of an engine diagnostic system.

In addition, and referring back now to FIG. 4, the power supply of the sensing assembly is in one embodiment configured to have a rechargeable battery (power supply) having a pair of terminals 44 protruding outwardly from the housing so that the battery may be recharged.

In addition, and since the sensing assembly of exemplary embodiments of the present invention provides a speed signal independent of the type of crank position signal being employed (e.g. 6x, 24x, 60x as well as coding and format (e.g., analog or digital format)) the sensing assembly allows the same to be used in any vehicle as it operates independently of the crank position sensor.

Figure 7:
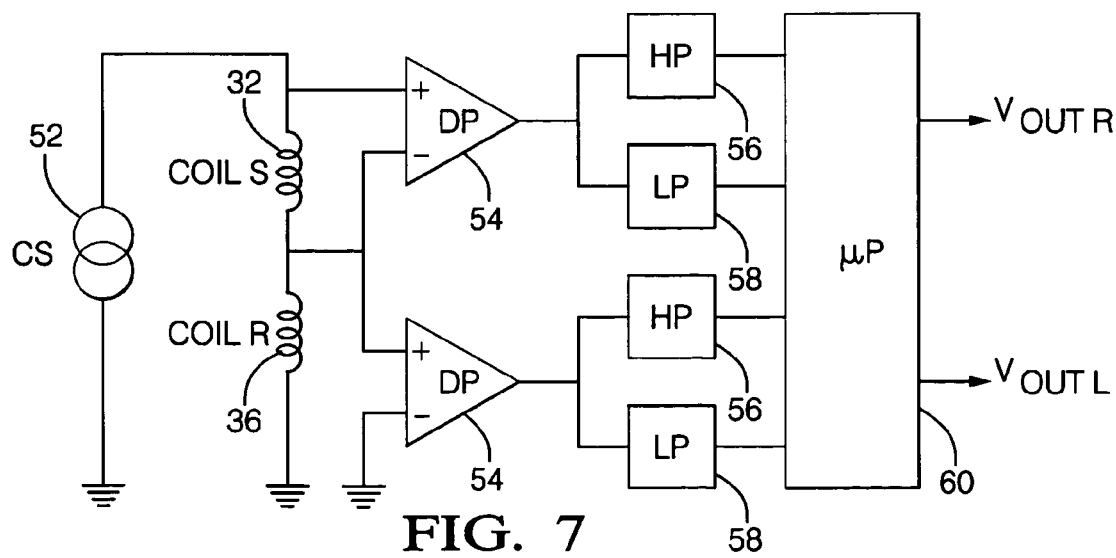
FIG. 7 is a schematic illustration of a circuit for use in exemplary embodiments of the present invention.

FIG. 7 is a schematic illustration of a circuit for use in exemplary embodiments of the present invention. Here an interface circuit 38 is shown schematically. With reference to FIG. 7 the following is noted:

CS—current source generating $I=i_0+i_0 \sin \omega t$ (i.e. an AC current with a DC offset)
COIL S—sensing coil exposed to tensile stress
COIL R—reference coil not subjected to tensile stress
DA—differential amplifier
HP—high pass filter
LP—low pass filter
μP—microprocessor or DSP
$V_{out\ R}$—resistive mode output signal
$V_{out\ L}$—inductive mode output signal A current source 52 provides a current I defined as $I=i_0+i_0 \sin \omega t$ (i.e., an AC current with a DC offset) to the sensing coil 32 and the reference coil 36, which is not exposed to tensile stress as the sensor rotates (i.e., the coil contained under compression within the rigid ring so that centrifugal forces do not place a tensile stress on the reference coil). Electrically coupled to the sensing coil and the reference coil are a pair of differential amplifiers 54 each providing outputs to high pass filters 56 and low pass filters 58 wherein the high pass filters and the low pass filters are configured to provide outputs to a microprocessor or digital signal processor (DSP) 60, which comprises logic to provide a resistive mode output signal ($V_{outR}$) and an inductive mode output signal ($V_{outL}$) for use in determining engine speed in accordance with exemplary embodiments of the present invention.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A removable sensor assembly for non-intrusively sensing instantaneous speed of an engine comprising a crankshaft having an end connected to an externally accessible bolt, the removable sensor assembly comprising:
    a housing comprising a recess configured to removably receive and engage a portion of the externally accessible bolt; and
    a force sensing device located in the housing, the force sensing device being configured to wirelessly provide information indicative of angular motion of the crankshaft, the force sensing device comprising:
        at least one coil;
        a power supply for providing an excitation to the coil, wherein the coil provides a first signal and a second signal each corresponding to the movement of the housing, the first signal corresponding to the resistance of the coil with respect to angular motion of the crankshaft and the second signal corresponding to the inductance of the coil with respect to angular motion of the crankshaft; and
        a signal transmitter coupled to the coil to receive and transmit the first signal and the second signal.

2. The removable sensor assembly as in claim 1, wherein the housing further comprises a magnet affixed within the recess to provide removable securement of the housing to the bolt.

3. The removable sensor assembly as in claim 1, wherein said force sensing device further comprises a reference coil.

4. The removable sensor assembly as in claim 3, wherein the reference coil provides a third signal and a fourth signal each corresponding to the movement of the housing, the third signal corresponding to the resistance of the reference coil and the fourth signal corresponding to the inductance of the reference coil, wherein the reference coil is disposed with the housing under compression.

5. The removable sensor assembly as in claim 4, wherein a rigid ring is disposed between the reference coil and the at least one coil and the signal transmitter is also coupled to the reference coil to receive and transmit the third signal and the fourth signal.

6. The removable sensor assembly as in claim 4, wherein the at least one coil comprises an electrically conductive magnetostrictive material.

7. The removable sensor assembly as in claim 4, wherein the at least one coil is shaped in a ring and the reference coil is shaped in a ring and the reference coil is disposed within the at least one coil.

8. The removable sensor assembly as in claim 5, wherein the at least one coil is shaped in a ring and the rigid ring is disposed within the at least one coil and the reference coil is shaped in a ring and the reference coil is disposed within the rigid ring.

9. The removable sensor assembly as in claim 4, wherein the reference coil comprises any one of the following: copper, alloys thereof, nickel, alloys thereof, stainless steel and an electrically conductive magnetostrictive material.

10. The removable sensor assembly as in claim 1, wherein the at least one coil is shaped in a ring.

11. The removable sensor assembly as in claim 1, wherein the power supply is a rechargeable battery having a pair of terminals depending outwardly from the housing.

12. A removable sensor assembly for non-intrusively sensing the speed of an engine comprising a crankshaft, the removable sensor assembly comprising:
  a housing comprising a recess configured to removably receive and engage a portion of an item directly coupled to the crankshaft, wherein rotation of the crankshaft rotates the item; and
  a force sensing device received in the housing, the force sensing device being configured to wirelessly provide information indicative of angular motion of the crankshaft, the force sensing device comprising:
    a first coil, the first coil being configured into a ring;
    a second reference coil, the second coil being configured into a ring and being disposed within the first coil;
    a ring disposed between the first coil and the second coil, wherein the ring precludes a tensile force from being applied to the second reference coil;
    a power supply for providing an excitation to the first coil and the second coil, wherein the first coil provides a first signal and a second signal each corresponding to the movement of the housing, the first signal corresponding to the resistance of the first coil with respect to angular motion of the crankshaft and the second signal corresponding to the inductance of the first coil with respect to angular motion of the crankshaft and wherein the second coil provides a third signal and a fourth signal each corresponding to the movement of the housing, the third signal corresponding to the resistance with respect to angular motion of the crankshaft of the second coil and the fourth signal corresponding to the inductance of the second coil with respect to angular motion of the crankshaft; and
    a signal transmitter coupled to the coils to receive and transmit the first signal, the second signal, the third signal and the fourth signal.

13. The removable sensor assembly as in claim 12, wherein the housing further comprises a magnet affixed within the recess to provide removable securement of the housing to the item.

14. The removable sensor assembly as in claim 13, wherein the item is a bolt secured to the crankshaft and the recess is configured to receive and engage a portion of the bolt.

15. The removable sensor assembly as in claim 12, wherein the first coil comprises a nickel iron alloy.

16. The removable sensor assembly as in claim 15, wherein the first coil comprises a nickel iron alloy, wherein the nickel comprises 30–82 percent of the alloy.

17. The removable sensor assembly as in claim 16, wherein the second reference coil comprises any one of the following: copper, alloys thereof, nickel, alloys thereof, stainless steel and an electrically conductive magnetostrictive material.

18. The removable sensor assembly as in claim 12, wherein the power supply is a rechargeable battery.

19. A method for non-intrusively sensing instantaneous speed of an engine comprising a crankshaft having an end with an externally accessible bolt, the method comprising:
  affixing a sensor assembly to the externally accessible bolt, the sensor assembly comprising:
    a first coil, the first coil being configured into a ring;
    a second reference coil, the second coil being configured into a ring and being disposed within the first coil;
    a ring disposed between the first coil and the second coil, wherein the ring precludes a tensile force from being applied to the second reference coil;
    a power supply for providing an excitation to the first coil and the second coil, wherein the first coil provides a first signal and a second signal each corresponding to the movement of the housing, the first signal corresponding to the resistance of the first coil with respect to angular motion of the crankshaft and the second signal corresponding to the inductance of the first coil with respect to angular motion of the crankshaft and wherein the second coil provides a third signal and a fourth signal each corresponding to the movement of the housing, the third signal corresponding to the resistance of the second coil with respect to angular motion of the crankshaft and the fourth signal corresponding to the inductance of the second coil with respect to angular motion of the crankshaft; and
    a signal transmitter coupled to the first coil and the second coil, the signal transmitter being configured to receive and transmit the first signal, the second signal, the third signal and the fourth signal as an output signal, wherein the signal transmitter wirelessly transmits the output signal from the sensor assembly.

* * * * *